United States Patent

Nelson

[11] 3,987,812
[45] Oct. 26, 1976

[54] ADAPTER VALVE

[75] Inventor: Lowell F. Nelson, Muskegon, Mich.

[73] Assignee: Enterprise Brass Works, Muskegon, Mich.

[22] Filed: Nov. 10, 1975

[21] Appl. No.: 630,303

[52] U.S. Cl. .................................. 137/219; 251/83; 251/250
[51] Int. Cl.² ................................. F16K 31/54
[58] Field of Search ............ 137/219; 251/83, 25 D

[56] References Cited
UNITED STATES PATENTS
3,520,324  7/1970  Meregalli .......................... 251/83 X

*Primary Examiner*—Alan Cohan
*Assistant Examiner*—Gerald A. Michalsky
*Attorney, Agent, or Firm*—McGlynn and Milton

[57] ABSTRACT

An adaptor assembly including an adapter body having a fluid passage extending therethrough with a poppet valve movable between open and closed positions. The poppet valve is supported on a valve stem having a gear rack thereon. A shaft extends into the adapter body and supports a manually movable handle exteriorly of the adapter body. A pinion engaging the gear rack is supported on the shaft through a lost motion connection so that the poppet valve may automatically open as the pinion rotates independently of the shaft yet may be opened as the pinion is rotated by the shaft.

5 Claims, 3 Drawing Figures

ADAPTER VALVE

BACKGROUND OF THE INVENTION

1. Field of the Invention

This invention relates to new and useful improvements in refueling equipment and, more particularly, to fuel adapters which interconnect two fuel lines or pipes.

2. Description of the Prior Art

Adapters are connected to fuel tanks of refueling trucks and include an adapter valve movable between open and closed positions. A hose, which is connected to a ground tank or similar fuel source, is connected to the adapter by a coupler which is connected in sealing relationship to the adapter and automatically opens the adapter valve when the coupler valve is opened. When a coupler is used which doesn't have a valve, the valve of the adapter must be opened manually by an easily accessible handle. Because it is desirable to use only one adapter with either type of coupler, an adapter should be capable of operation in either the automatic or the manual mode. In the automatic mode the adapter must open without attendant handle motion, yet this very handle must operate to open the adapter when the manual mode is desired. Therefore, it is desirable to provide a lost motion connection between the adapter valve and the handle of the adapter.

Lost motion connections have been provided between the adapter valve and its handle by means of linkage interconnecting the valve and the shaft supporting the handle and is functional when the handle is moved axially inwardly toward the adapter body as exemplified by the U.S. Pat. No. 3,590,862 granted July 6, 1971 to Paul A. DeGraaf.

When an adapter valve is used in combination with a rack and pinion gearing connection between the valve and the handle, the lost motion connection has, in the past, been provided between the valve stem supporting the adapter valve and the rack. More specifically, the rack includes an arm disposed in an axially extending slot in the valve stem. The arm and the slot are arranged such that the valve may be opened without corresponding movement of the rack; however, when the rack is moved by means of the pinion, the arm engages the end of the slot and, therefore, forces movement of the valve stem and valve.

The present invention provides a simple lost motion connection between the pinion and the shaft on which the pinion is rotatably mounted. The invention not only does away with excessive parts and machining costs but also maintains the adapter handle at a predetermined distance from the adapter body thereby eliminating fluid leakage problems along the shaft of the handle.

SUMMARY OF THE INVENTION

An adapter assembly is provided comprising an adapter body having a fluid passage extending therethrough. A valve means normally closes the adapter body passage and is movable to an open position. The valve means has a valve stem on which a gear rack is formed. A handle means is positioned exteriorly of the adapter body. A shaft is connected to the handle means and extends into the adapter body and a pinion is rotatably mounted on the shaft and engages the rack. A lost motion connection means connects the shaft to the pinion to manually rotate the pinion as the shaft is rotated to open the valve means. The lost motion connection means also permits the automatic opening of the valve means by allowing the pinion to rotate independently of the shaft.

Other advantages of the present invention will be readily appreciated as the same becomes better understood by a reference to the following detailed description when considered in connection with the accompanying drawings wherein.

DESCRIPTION OF THE PREFERRED EMBODIMENT

Figure 1:
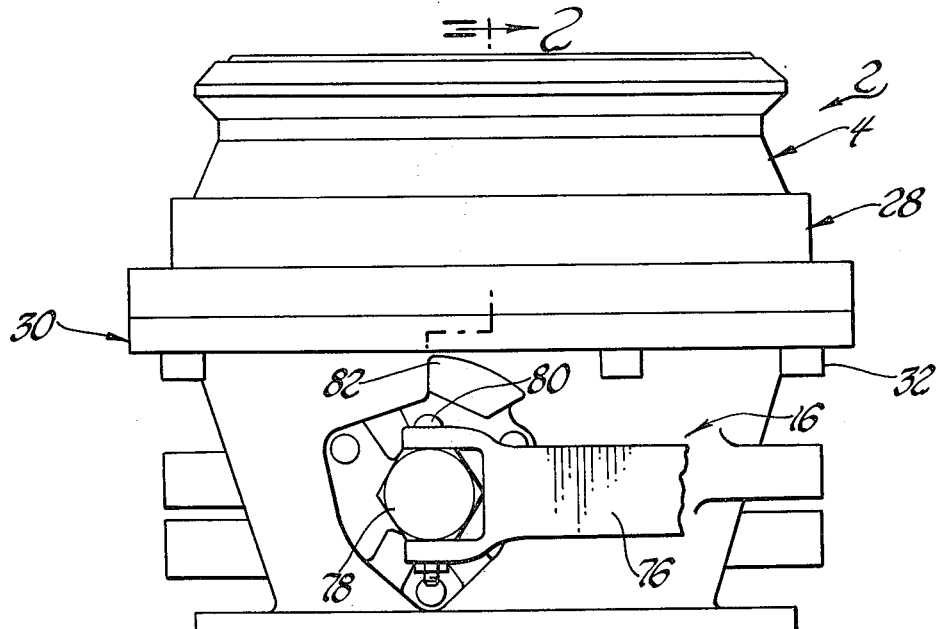
FIG. 1 is a side elevational view of the adapter assembly showing the handle means for manually opening the adapter valve of the adapter assembly.
Figure 2:
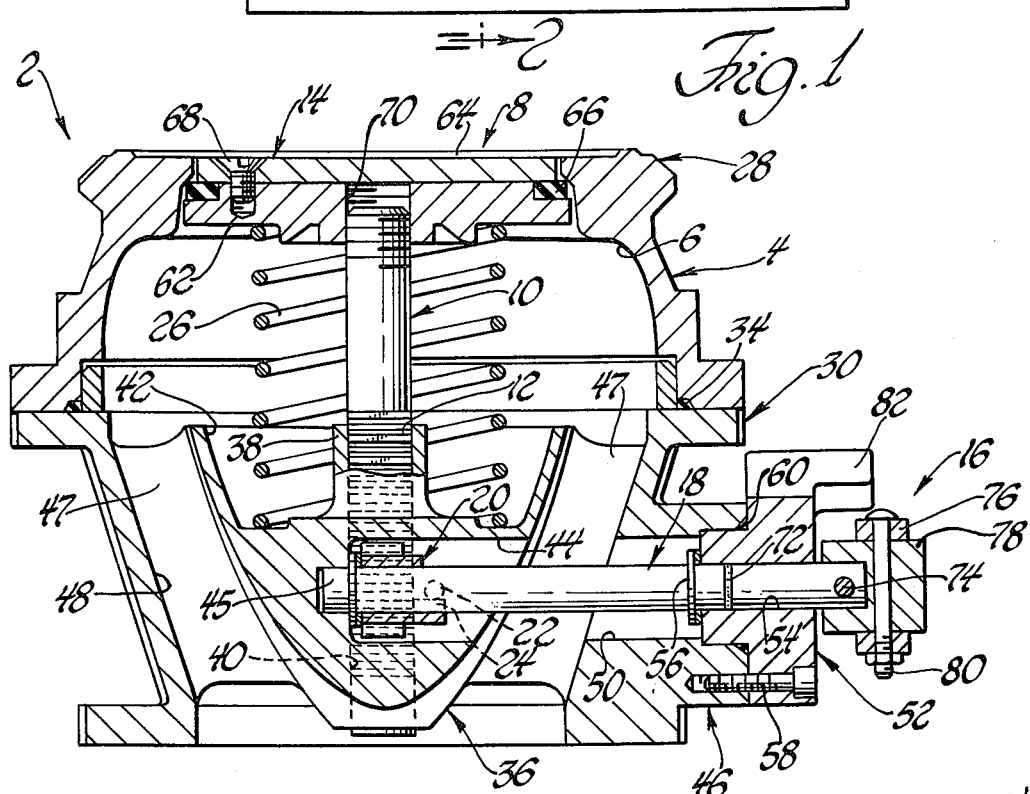
FIG. 2 is a cross-sectional view taken substantially along lne 2—2 of FIG. 1.

An adapter assembly constructed in accordance with the subject invention is generally shown at 2 in FIGS. 1 and 2. The adapter assembly 2 comprises an adapter body generally indicated at 4 and which has a fluid passage 6 extending therethrough.

Figure 3:
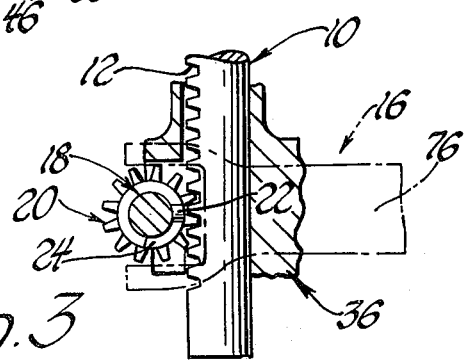
FIG. 3 is a fragmentary cross-sectional view showing the lost motion connection means between the handle shaft and the pinion.

The assembly also includes a valve means generally indicated at 8 for normally closing the adapter body fluid passage 6 and is movable to an open position. The valve means 8 includes an adapter or poppet valve assembly generally indicated at 14 and a supporting valve stem generally indicated at 10. A gear rack 12 is formed in the valve stem 10, as best shown in FIG. 3. The valve stem 10 is screwed into the lower surface or bottom of the poppet valve assembly 14 such that the valve stem 10 is carried with poppet valve assembly 14 when the poppet valve assembly 14 is caused to move within the adapter body passage 6.

The assembly 2 also includes a handle means generally shown at 16 and which is positioned exteriorly of the adapter body 4. A shaft generally indicated at 18 extends into the adapter body 4 and is connected to the handle means 16. A pinion generally indicated at 20 is rotatably mounted on the shaft 18 and is in meshing engagement with the gear rack 12.

Also included is a lost motion connection means connecting the shaft 18 to the pinion 20 for manually rotating the pinion 20 as the shaft 18 is rotated to open the valve means and for allowing the pinion 20 to rotate independently of the shaft 18 to permit the automatic opening of the valve means 8. The lost motion connection means includes a pin 22 connected to the shaft 18 and a lug 24 defined by a portion of the pinion 20.

The pin 22 engages the lug 24 during the rotation of the shaft 18 to force the pinion 20 to rotate with the shaft 18. The lug 24 is fixedly attached to the pinion 20 and projects along the longitudinal axis of the shaft 18. As a result of this engagement, the pinion 20 is forced to rotate as the shaft 18 is rotated by the handle means 16 to move the valve stem 10 axially which, in turn, moves the poppet valve assembly 14 into the fluid passage 6 to thereby open the valve means 8. During this movement the pinion 20 rotates in a clockwise direction while it engages rack 12 to move the rack 12 downwardly. As shown in FIG. 2, the poppet valve assembly 14 is shown in the closed position blocking adapter body fluid passage 6 to prevent the passage of any fluid through adapter body 4. If the handle assembly 16 is rotated downward as shown in FIG. 3, pin 22 will engage lug 24, thus forcing pinion 20 to rotate in a clockwise direction and thereby move the valve stem 10 downward to open the adapter body passage 6.

The pinion 20 remains in engagement with rack 12 during any openings of the poppet and stem assembly 8, including both the manual and automatic openings.

The valve means 8 also includes a spring 26 which biases the poppet valve assembly 14 to the closed position. Automatic opening of adapter body passage 6 is accomplished by forcing the poppet valve assembly 14 downward against the biasing of the spring 26. The downward motion of the gear rack 12 causes the pinion 20 to move in a clockwise direction, as shown in FIG. 3. However, shaft 18 will not rotate because lug 24 must rotate in excess of 180° before encountering the pin 22 on shaft 18. Before lug 24 reaches pin 22, the adapter body fluid passage 6 is fully open. Thus, there is no rotation of shaft 18 when the adapter assembly 2 is in its automatic opening mode.

The adapter body 4 includes a top member generally indicated at 28, and a bottom member generally indicated at 30 and attached to the top member 28. The adapter body 4 also includes a seal ring 34 disposed between the top member 28 and the bottom member 30 to seal and prevent the passage of fluids between the two members 28 and 30. Cap screws 32 of adapter body 4 are provided for attaching the bottom member 30 to the top member 28.

The bottom member 30 includes an interior bullet structure generally indicated at 36. The bullet structure 36 has a collar 38 and a first bore 40 extending through the collar 38. The stem 10 extends through the bore 40. The bullet structure 36 also includes a dished out cavity 42 disposed about the collar 38. A second bore 44 extends traverse to the first bore 40 in the bullet structure 36. The shaft 18 is disposed in the second bore 44 and has its distal end 45 rotatably supported in a smaller bore or recess in the bullet structure 36.

The bottom member 30 also includes an exterior support structure generally indicated at 46 for supporting the bullet structure 36, the bullet structure 36 being integrally connected to and supported by the support structure 46 through two or more support vanes 47. The fluid flows downwardly between the bullet structure 36 and the support structure 46 and is divided only by the support vanes 47. A portion 48 of the fluid passage 6 extends between the structures 36 and 46 and the vanes 47. A third bore 50 is coaxial with the second bore 44 and extends into the fluid passage 6 from the exterior of the assembly 2. The shaft 18 extends through the third bore 50 and into second bore 44.

The bottom member 30 includes the plug structure 52 attached to the support structure 46 in the third bore 50. The plug structure 52 has a support bore 54 extending therethrough. The support bore 54 is smaller than and coaxial with the third bore 50 and the shaft 18 is rotatably supported in and extends through the support bore 54.

A snap ring 56 is connected to the shaft 18 and abuts the plug structure 52 for limiting the axial movement of the shaft 18 within support bore 54.

The bottom member 30 also has a seal 60 which seals the support structure 46 and the plug structure 52. The plug structure 52 is attached to the support structure by a fastener screw 58. The bottom member 30 also includes a first O-ring 72 positioned about the shaft 18 to provide a seal between the shaft 18 and the plug structure 52.

As alluded to above, the valve means 8 includes spring 26 which is biased against bullet structure 36 within the dished out cavity 42. The poppet valve assembly 14 includes a bottom plate 62 and a top plate 64. The bottom plate 62 engages the spring 26 and has a bore 70 which threadedly receives the valve stem 10. The top plate 64 is adjacent to and attached to bottom plate 62 by one or more head screws 68. The poppet valve assembly 14 also includes a seal ring 66 disposed between the top plate 64 and bottom plate 62 for sealing the adapter body fluid passage 6 when the valve means 8 is in the closed position shown in FIG. 2.

The handle means 16 includes handle 76, block 78, bolt assembly 80 and shaft pin 74. The bolt assembly 80 movably attaches the handle 76 to the block 78 while shaft pin 74 fixedly secures the block 78 to the shaft 18. The handle 76 may rotate about the axis of the bolt assembly 80 to interlock with handle abutments 82. The downward movement of handle 76 about the axis of the shaft 18 provides clockwise rotational movement of the shaft 18, as viewed in FIG. 3.

The invention has been described in an illustrative manner, and it is to be understood that the terminology which has been used is intended to be in the nature of words of description rather than of limitation.

Obviously, many modifications and variations of the present invention as possible in light of the above teachings. It is, therefore, to be understood that the invention may be practiced otherwise than as specifically described yet remain within the scope of the appended claims.

The embodiments of the invention in which an exclusive property or privilege is claimed are defined as follows:

1. An adapter assembly comprising: an adapter body having a fluid passage extending therethrough, valve means for normally closing said adapter body fluid passage and movable to an open position, said valve means including a valve stem with a gear rack thereon, handle means exteriorly of said adapter body, a shaft connected to said handle means and extending into said adapter body, a pinion rotatably mounted on said shaft and engaging said gear rack, and lost motion connection means connecting said shaft to said pinion for rotating said pinion as said shaft is rotated to open said valve means and for allowing said pinion to rotate independently of said shaft to permit the automatic opening of said valve means.

2. The adapter assembly as set forth in claim 1 wherein said lost motion connection means engages a portion of said pinion during rotation of said shaft to force said pinion to rotate therewith.

3. The adapter assembly as set forth in claim 2 wherein said lost motion connection means includes a first pin fixedly attached to said shaft and a lug fixedly attached to said portion and projecting along the longitudinal axis of said shaft for engagement by said first pin.

4. The adapter assembly as set forth in claim 3 wherein said pinion engages said rack during any openings of said valve means.

5. The adapter assembly as set forth in claim 4 wherein, said adapter body includes:
 a top member,
 a bottom member attached to said top member,
 a seal ring disposed between said top member and said bottom member, at least one cap screw attaching said bottom member to said top member, and wherein said bottom member includes:
a bullet structure having a collar, and a first bore formed through said collar, said stem extending through said first bore; said bullet structure further having a dished out cavity disposed about said collar, and a second bore extending traverse to said first bore; and shaft disposed in said second bore;
a support structure having vanes interconnecting said support structure and said bullet structure for supporting the latter,
a third bore coaxial with said second bore and extending into said fluid passage from the exterior of said assembly, said shaft extending through said third bore;
a plug structure attached to said support structure in said third bore and having a support bore extending therethrough and coaxial with said third bore, said shaft rotatably supported in and extending through said support bore;
a snap ring connected to said shaft and abutting said plug structure for limiting axial movement of said shaft;
a fastener screw interconnecting the plug and support structures for attaching said plug structure to said support structure; and a first O-ring disposed about said shaft to provide a seal between said shaft and said plug structure;
and wherein said valve means includes:
a spring biased against said bullet structure within said dished out cavity,
a poppet valve assembly attached to said valve stem and having,
a bottom plate engaging said spring and having a bore receiving said valve stem,
a top plate adjacent to said bottom plate, at least one head screw attaching said top plate to said bottom plate;
a seal ring disposed between said top plate and said bottom plate for sealing said adapter body fluid passage when said valve means is in said closed position, and
wherein said handle means includes:
a handle,
a block,
a bolt assembly fixedly attaching said handle to said block, and
a second pin fixedly securing said block to said shaft.

* * * * *